(12) United States Patent
Mahamuni (10) Patent No.: US 9,056,298 B2
(45) Date of Patent: Jun. 16, 2015

(54) CAVITATION REACTOR WITHIN RESONATOR

(75) Inventor: Naresh Mahamuni, Nevada City, CA (US)

(73) Assignee: BURST ENERGIES, INC., Dover, DE (US)

( * ) Notice: Subject to any disclaimer, the term of this patent is extended or adjusted under 35 U.S.C. 154(b) by 1113 days.

(21) Appl. No.: 13/075,355

(22) Filed: Mar. 30, 2011

(65) Prior Publication Data

US 2012/0247947 A1    Oct. 4, 2012

(51) Int. Cl.
*B01F 11/00* (2006.01)
*B01J 19/00* (2006.01)
*B01J 19/10* (2006.01)

(52) U.S. Cl.
CPC ............. *B01J 19/008* (2013.01); *B01J 19/10* (2013.01); *B01J 2219/0869* (2013.01); *B01J 2219/0875* (2013.01); *B01J 2219/0877* (2013.01)

(58) Field of Classification Search
CPC ............ B01F 11/0241; B01F 11/0266; B01F 11/0283
USPC ................. 366/108, 110–114, 118, 127
See application file for complete search history.

(56) References Cited

U.S. PATENT DOCUMENTS

| | | | | |
|---|---|---|---|---|
| 2,033,121 A | * | 3/1936 | Chambers | 426/238 |
| 2,673,811 A | * | 3/1954 | Tsunoda | 106/167.01 |
| 2,855,526 A | * | 10/1958 | Jones | 310/335 |
| 2,876,083 A | * | 3/1959 | Prietl | 23/295 R |
| 3,066,686 A | * | 12/1962 | O'Neill | 134/122 R |
| 7,731,412 B2 | * | 6/2010 | Sparey-Taylor et al. | 366/127 |
| 2002/0009015 A1 | * | 1/2002 | Laugharn et al. | 366/108 |

* cited by examiner

*Primary Examiner* — David Sorkin
(74) *Attorney, Agent, or Firm* — EcoTech Law Group, P.C.

(57) ABSTRACT

A system including an ultrasonic resonance chamber containing a cavitation reaction chamber therein is described. In some embodiments, the resonance chamber or resonator comprises a spherical metal shell having fluid and other couplings and containing a first liquid that carries an acoustic field within the resonator. A second fluid or material that can flow within the reaction chamber or reactor is disposed at a location in the resonator so that the two fluids do not mix but the acoustic field in the resonator can generate cavitation inside the reactor to cause a desired transformation or reaction in the second fluid or material.

10 Claims, 7 Drawing Sheets

CAVITATION REACTOR WITHIN RESONATOR

TECHNICAL FIELD

The present application relates to cavitation systems and more particularly to systems for causing cavitation in a sample presented within a reactor chamber, which is disposed within a larger acoustic resonator.

BACKGROUND

It is known that acoustic fields can be applied to fluids (e.g., liquids, gases) within resonator vessels or chambers. For example, standing waves of an acoustic field can be generated and set up within a resonator containing a fluid medium. The acoustic fields can be described by three-dimensional scalar fields conforming to the driving conditions causing the fields, the geometry of the resonator, the physical nature of the fluid supporting the acoustic pressure oscillations of the field, and other factors.

One common way to achieve an acoustic field within a resonator is to attach acoustic drivers to an external surface of the resonator. The acoustic drivers are typically electrically-driven using acoustic drivers that convert some of the electrical energy provided to the drivers into acoustic energy. The energy conversion employs the transduction properties of the transducer devices in the acoustic drivers. For example, piezo-electric transducers (PZT) having material properties causing a mechanical change in the PZT corresponding to an applied voltage are often used as a building block of electrically-driven acoustic driver devices. Sensors such as hydrophones can be used to measure the acoustic pressure within a liquid, and theoretical and numerical (computer) models can be used to measure or predict the shape and nature of the acoustic field within a resonator chamber.

If the driving energy used to create the acoustic field within the resonator is of sufficient amplitude, and if other fluid and physical conditions permit, cavitation may take place at one or more locations within a liquid contained in an acoustic resonator. During cavitation, vapor bubbles, cavities, or other voids are created at certain locations at times within the liquid where the conditions (e.g., pressure) at said certain locations and times allow for cavitation to take place.

Some existing systems allow for cavitation to occur inside a body of an acoustic resonator so as to achieve a desired result (e.g., a transformation or a reaction) in the fluid being cavitated. This however requires filling the volume of the resonator with the material on which cavitation is desired. In practice, cavitation often only occurs near a small volume in the interior of the resonator chamber, e.g., near its center. Therefore, a large amount of reactive material is traditionally pumped into a relatively large cavitation resonator and only a small fraction of that material is exposed to acoustic fields capable of causing cavitation to the fluid. Therefore, a long time is required to cause a noticeable reaction or transformation in the fluid in the resonator as a whole. The present disclosure makes improvements to the effectiveness and efficiency of such cavitation reaction processes and systems.

SUMMARY

Aspects of the present disclosure are directed to acoustic resonators and cavitation chambers. For example, those driven by ultrasound transducers to cause cavitation in a three-dimensional volume such as a sphere, cylinder, or other volume. Here, the resonator includes an interior reaction chamber or reactor. The reactor chamber has walls that are substantially transparent or transmissive to an ultrasonic field in a first fluid in the resonator so that the ultrasonic field penetrates the walls of the reactor and inward to cause cavitation in a second fluid substance inside the reactor. In some embodiments, the second and first fluid do not mix, their static pressures may be controlled by some pump or pressure source, and they may be controlled so as to flow or not flow through the system during application of the ultrasound field and cavitation events.

In specific applications, the reactor can be used to make a controlled flow of said second fluid (which may contain other substances such as biological substances, algae, or other chemical or organic materials) undergo cavitation in the second fluid substance. The fluid substance may therefore be a quasi-fluid or a slurry or a mixture or a compound or a solution, and may entrain solids and other materials as suited for the particular use. The flow rate of the second fluid may determine the cavitation dose or extent or intensity to which the materials in the second fluid substance are subjected.

Applications of the present systems and methods can be found in industrial, environmental, biomedical, scientific, and other fields.

One preferred embodiment is directed to an acoustic system, comprising a resonator a resonator shell, the resonator shell defining an interior volume of said resonator, said interior volume of said resonator adapted to contain a first fluid substance; at least one acoustic driver coupled to said resonator shell that delivers acoustic energy to cause an acoustic field within said first fluid in said interior volume of said resonator; a cavitation reactor chamber disposed within said interior volume of said resonator, said cavitation reactor chamber adapted to contain a second fluid substance; and said cavitation reactor chamber comprising a shell designed and arranged to be substantially permissive to said acoustic field so that said acoustic field can propagate from said interior volume of said resonator through said cavitation reactor chamber shell and into an interior volume of said cavitation reactor chamber so as to cause acoustic cavitation in said second fluid substance within said interior volume of said cavitation reactor chamber.

BRIEF DESCRIPTION OF THE DRAWINGS

For a fuller understanding of the nature and advantages of the present concepts, reference is be made to the following detailed description of preferred embodiments and in connection with the accompanying drawings, in which.

DETAILED DESCRIPTION

Figure 1:
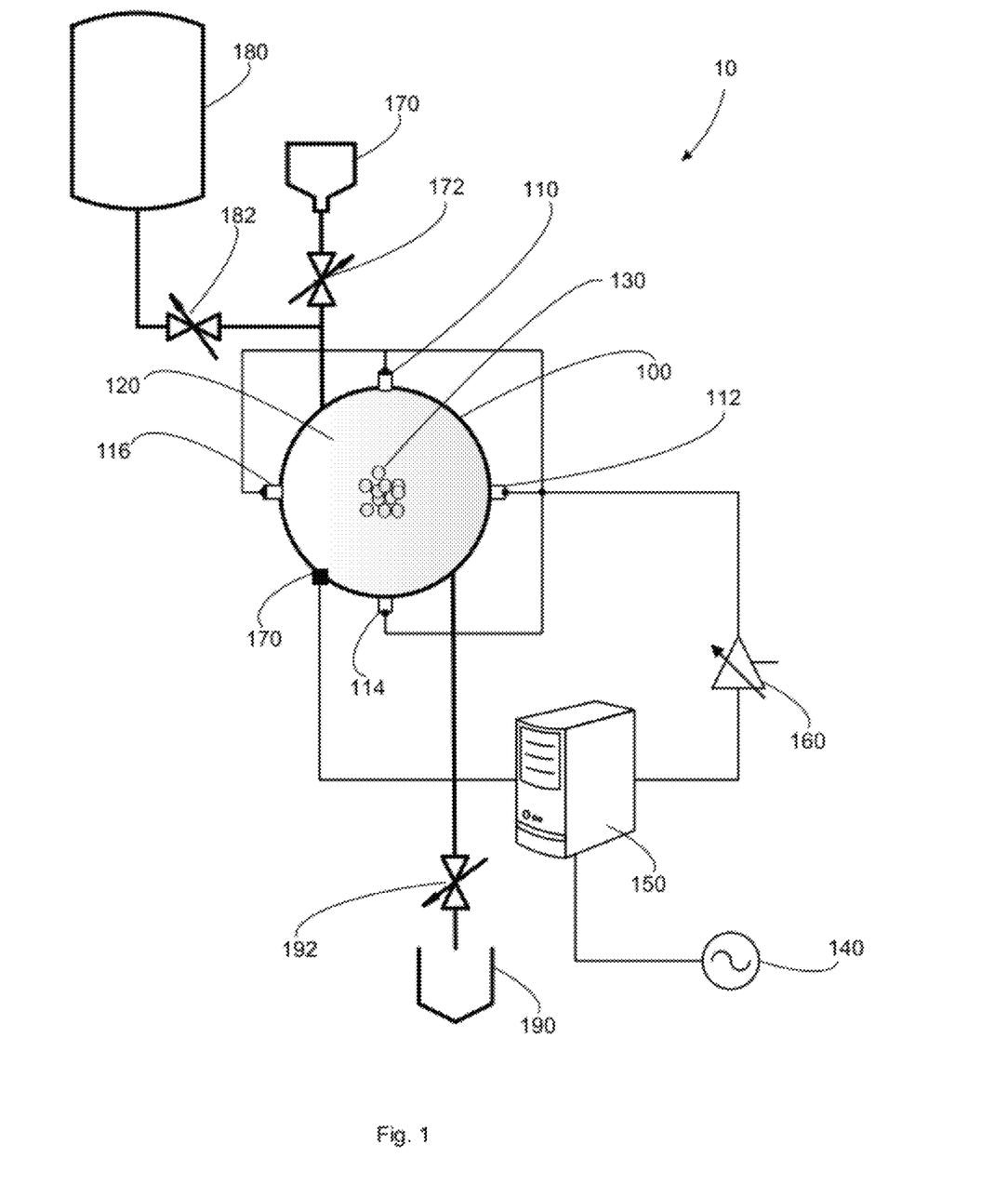
FIG. 1 illustrates an exemplary cavitation and control system 10.

FIG. 1 illustrates an exemplary cavitation and control system 10. An acoustic resonator chamber 100 is provided, which is preferably made of a solid material and having solid walls such as metal walls, and more specifically, such as stainless steel walls in some embodiments. The resonator has fluid inlets and outlets for filling and discharging a fluid substance 120.

Acoustic activity by one or more acoustic drivers (e.g., 110, 112, 114, 116) coupled to chamber 100 create an acoustic field within chamber 100. As mentioned before, the fluid in chamber 100 may be placed under static pressure by a pressure source such as a pump. The drivers may further cause acoustic cavitation 130 in at least a portion of the volume within chamber 100. The drivers are mechanically fixed to an outside surface of chamber 100 in some embodiments, such as by welding, epoxy fixing, or threading into corresponding mating places on the outside walls of chamber 100.

The drivers deliver oscillatory or vibratory or translational movement at a driving frequency in a typical embodiment. The driving signal may original in an oscillator 140, optionally being computer controlled by a computer 150 and amplified by an amplifier 160 to a desired amplitude. The plurality of drivers may all be driven in unison by a single driving signal or may be connected to a separate driving signals and sources and driven individually as needed. A sensor 170 may sense some parameter and send an output signal to computer 150 indicative of the sensed parameter. The sensor 170 may sense pressure within chamber 100, temperature in chamber 100, or an acoustic field or signal from chamber 100. A feedback circuit may be provided in computer 150 to control the driving signal(s) to the acoustic drivers responsive to a sensed signal measured by sensor 170.

Fluid (e.g., distilled water) may be provided from a source 180, which can be controlled by a shutoff or throttle valve 182. An active ingredient, chemical agent, catalyst material or other substance may be provided from a source 170, which may be coupled to the input fluid source by a valve 172. Premixing of the fluid and the active agent or chemical may take place prior to delivery of the same to chamber 100, but these ingredients may also be mixed inside chamber 100 as described earlier. For example, the mixing can be carried out in the presence of an acoustic field or a cavitation field in chamber 100.

A drain port is provided to discharge or drain the fluid contents 120 from chamber 100 through a drain valve 192 into a receiver 190. The fluid portion of the system 10 may be used to pressurize and depressurize the contents of chamber 100. The chamber 100 may be designed to be opened up, for example by making it from two half spherical shell portions that can be locked together when closed and then opened up to retrieve something from inside the spherical shell.

Figure 2:
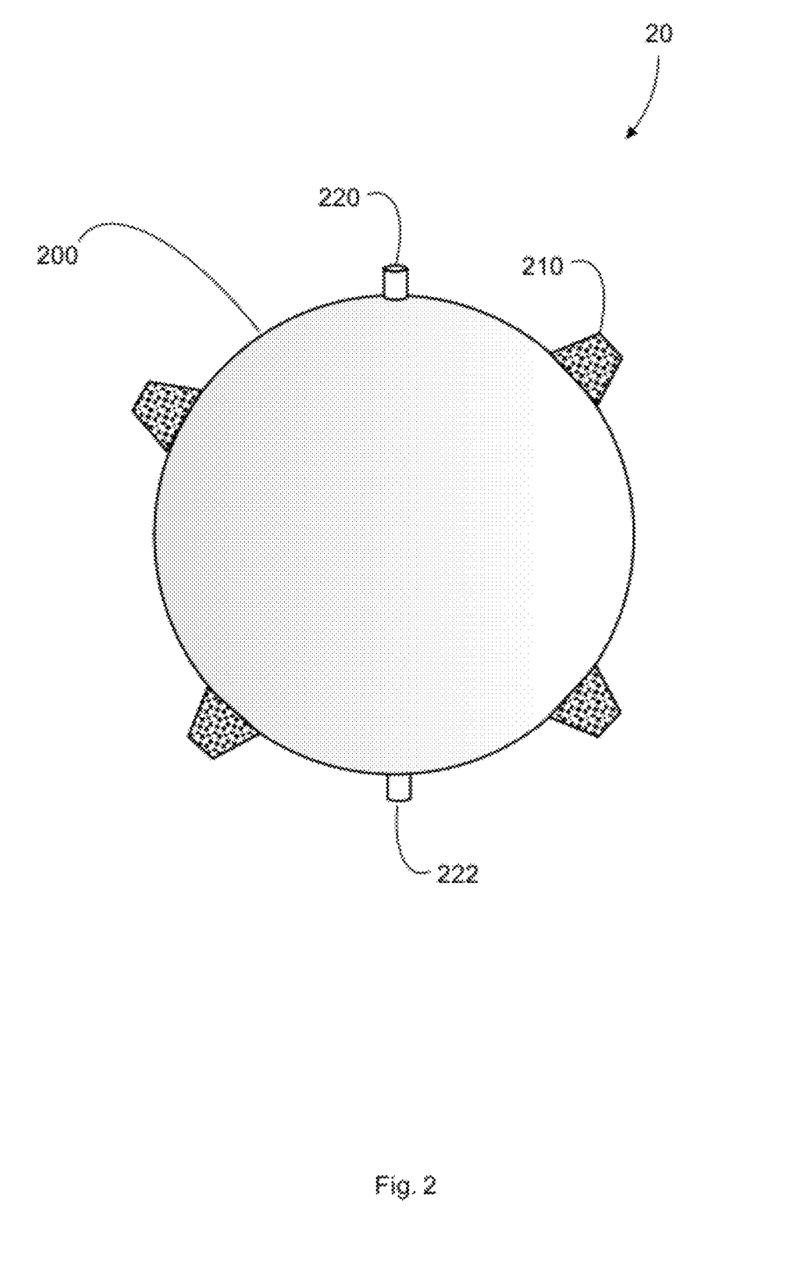
FIG. 2 illustrates an acoustic resonator according to one embodiment.

FIG. 2 illustrates an acoustic resonator 20. Acoustic resonator 20 comprises a three-dimensional shell 200, which may be a spherical shell that is made of a solid material such as a metal, e.g., stainless steel or other suitable material. Resonator shell 200 is adapted for coupling with a plurality of acoustic energy sources or transducers 210. Transducers 210 may mechanically and acoustically coupled to an external surface of shell 200, for example, by bonding or threading or welding or other coupling means.

Acoustic energy sources 210, e.g., ultrasound transducers, are located on the surface of resonator shell 200 as desired for a particular application. In some embodiments, a plurality of transducers 210 are coupled to a spherical resonator 20 so that the transducers 210 deliver to resonator shell 200 an ultrasonic energy at a given resonance frequencies of transducers 210. Shell 200 transmits the ultrasound energy from transducers 210 to a medium contained within shell 200. In some embodiments, the medium is a liquid such as water.

In a preferred embodiment, a spherical resonator shell 200 hold within it a liquid such as water, into which ultrasound energy is delivered and propagates inward from the shell 200 towards the center of the spherical resonator 20. As discussed earlier, for given parameters of acoustic driving energy and geometry of resonator 20 and other factors, acoustic cavitation may take place at or near a central volume within resonator 20. In order to cause a cavitation within resonator 20 that favorably affects a substance disposed within resonator shell 200, fluid inlet and exit ports 220 are situated at desired locations penetrating shell 200. Specifically, a fluid may flow in from inlet port 220 and may flow out from outlet port 222. In this way, ultrasonic energy resulting in cavitation at or near the center of resonator 20 may cause changes in the material within resonator 20, such changes depending on the nature of the material within the resonator 20 and also depending on the duration and energy level and frequency of the applied ultrasonic energy.

Figure 3:
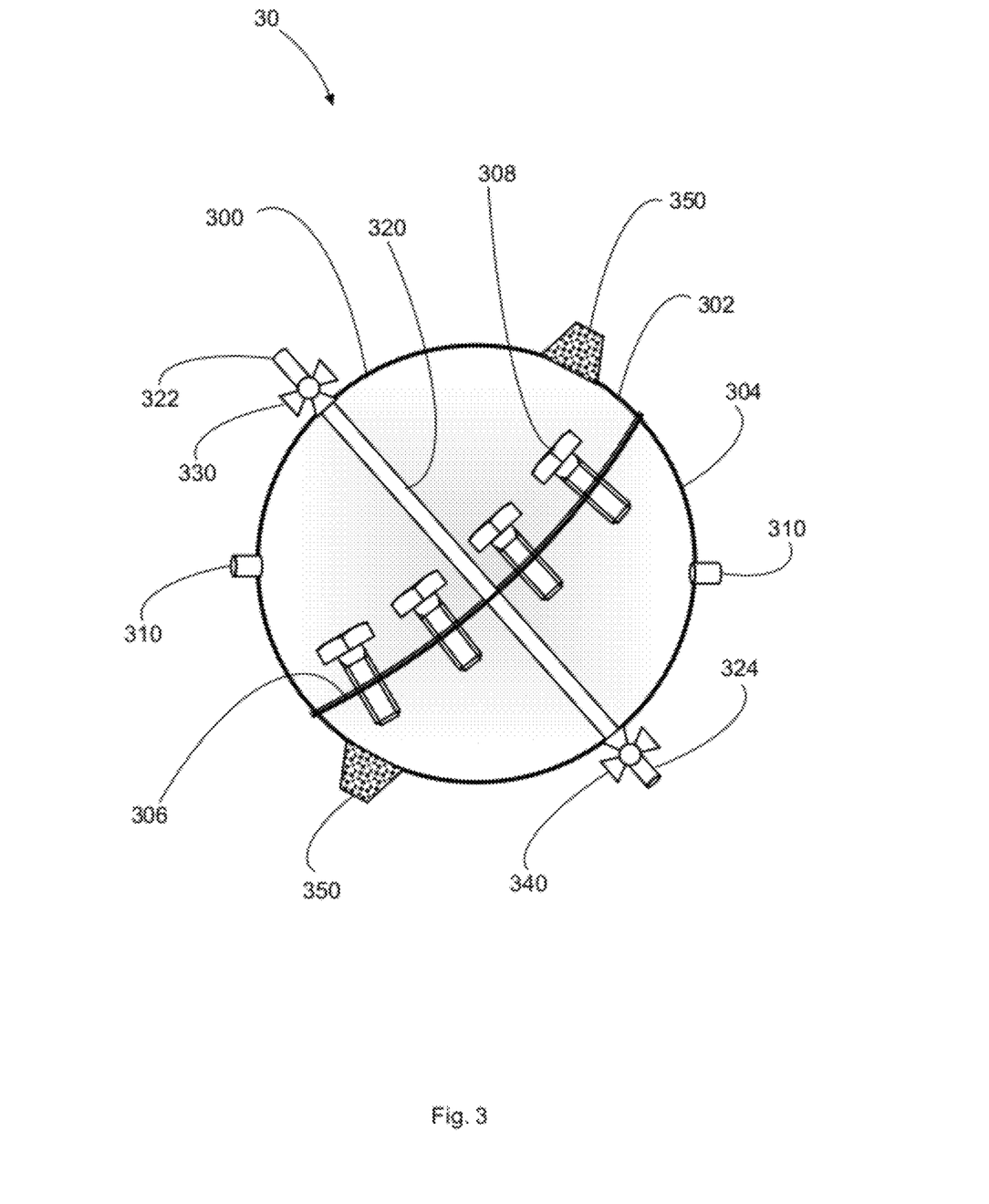
FIG. 3 illustrates another view of an exemplary resonator.

FIG. 3 illustrates another view of an exemplary resonator 30. As before, resonator 30 includes a resonator shell 300, which may be constructed of stainless steel or other suitable materials. Coupled to shell 300 are one or more acoustic energy sources such as ultrasonic transducers 350. Ultrasonic transducers 350 may be situated on the surface of shell 300 at a plurality of locations and in sufficient numbers so as to drive an acoustical field within the interior volume of resonator 30.

Fluid inlet and outlet ports 310 may penetrate one or more locations in shell 300 to allow for filling or emptying or controlling of a fluid pressure within the interior volume of shell 300.

As described earlier, resonator 30 may comprise a substantially spherical shell 300. Shell 300 may itself be manufactured by joining two or more portions thereof. In a preferred embodiment, to hemispheres 302 and 304 are joined at a junction 306. In various embodiments, junction 306 may be formed by welding or bonding or applying a suitable strong epoxy material to form a mechanically reinforced and fluid-proof seam, joining the two halves 302 and 304 of shell 300. In other embodiments, fasteners such as bolts 308 may be applied to a mating pair of flanges at the interface of junction 306 between the two halves of shell 300.

A tube or other fluid passageway 320 penetrates the shell 300 of resonator 30. In particular, the fluid passageway 320 is positioned so that acoustic cavitation takes place within a least one portion of passageway 320. This is shown in the figure, the fluid passageway 320 may have an inlet 322 and an outlet 324. Shut-off valves 330 and 340 may control the flow of fluid into the inlet 322 and outlet 324 of the fluid passageway 320, respectively.

In some aspects, a fluid or substance may be transmitted from inlet 322 into an interior volume of fluid passageway 320, which can then be subjected to the acoustic field provided by transducers 350. In some cases, at appropriate acoustical parameters and other conditions, cavitation may be induced in the material residing within fluid passageway 320. More specifically, cavitation may be induced into such a fluid so as to cause a reaction or a desired transformation in the substance of the fluid passing through fluid passageway 320.

It should be noted that not only liquids may be passed through passageway 320, but rather, a liquid slurry or mixture or solution or other combination of materials may flow through passageway 320.

In some embodiments, the volume defined by fluid passageway 320 may be considered a reactor or a reaction chamber, within which acoustic activity and transformations may take place on the material present within passageway 320. The shape and size of fluid passageway 320 may vary and the fluid or material in passageway 320 may be trapped therein during the acoustic reaction, or it may continue flowing from inlet 322 to outlet 324 during the acoustic reaction.

Figure 4:
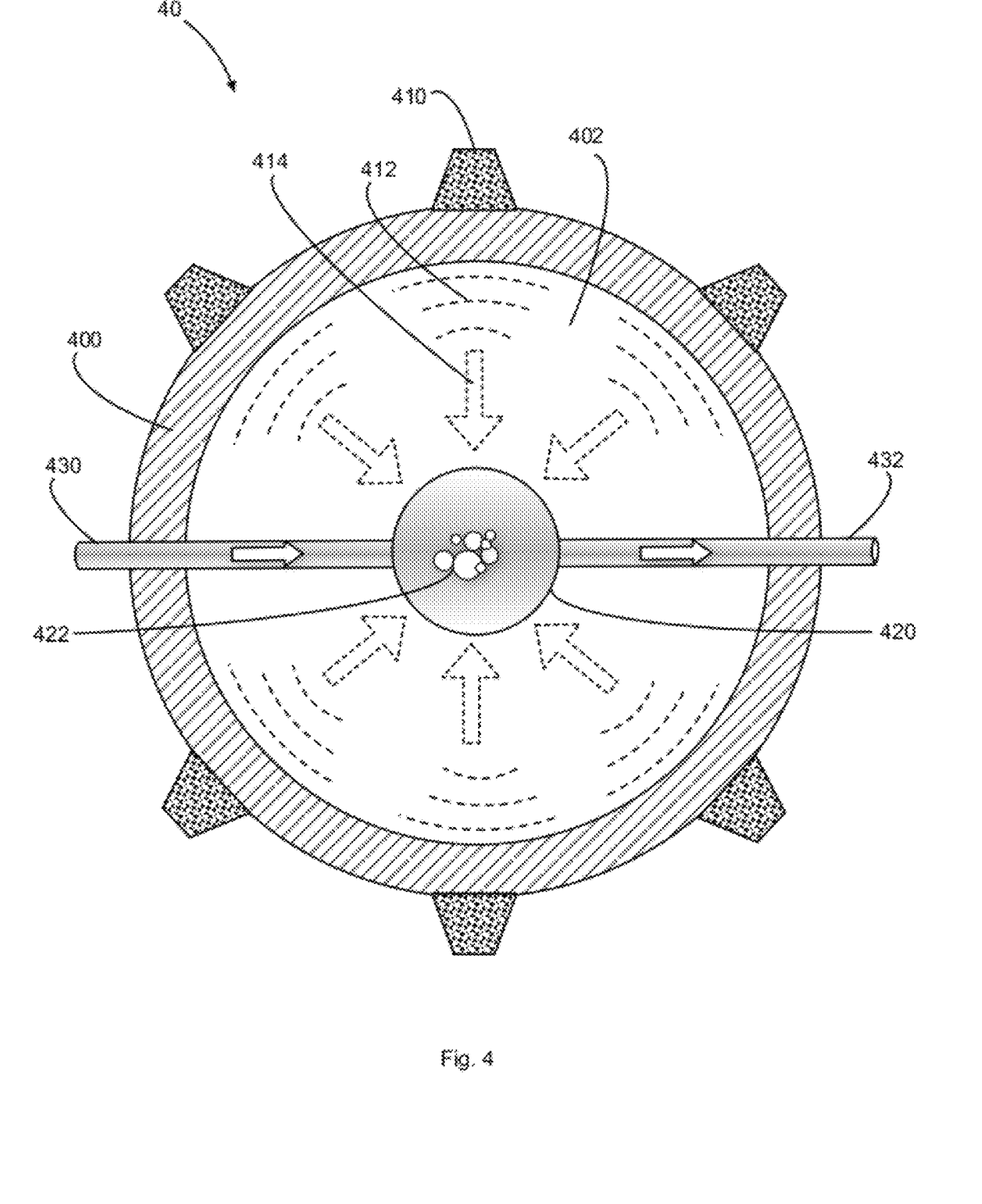
FIG. 4 illustrates an exemplary cross-section of an acoustic resonator with an acoustic reaction chamber therein.

FIG. 4 illustrates an exemplary cross-section of an acoustic resonator with an acoustic reaction chamber therein. The acoustic resonator system 40 comprises a resonator shell 400 as described earlier, which may consist of a spherical or other three-dimensional volume having a solid material composition. In some embodiments, the resonator system 40 comprises a substantially spherical stainless steel resonator shell 400.

A plurality of acoustic or ultrasonic energy sources 410 are disposed on and about an external surface or resonator shell 400. The acoustic transducers 410 may be driven individually or collectively or in groups so as to emit an acoustic energy field 412, which propagates inwardly as shown by arrows 414 towards a central volume of the resonator system 40.

A reactor or a reaction chamber 420 is located within the interior of resonator shell 400 and in some embodiments at or near a central volume of the resonator system 40. The reactor 20 provides a volume which may be filled with a material of interest and which may include a zone of cavitation 420 that acts on the material, fluid, or other substances injected in the reaction chamber 420. As described above, a material onto which it is desired that the acoustic field act may be injected into the reactor 420 through an inlet port 430 and following acoustic reaction at cavitation zone 422, the material may be passed out of the resonator system through outlet port 432.

In the example of a spherical or substantially spherical system 40, the resonator shell 400 and spherical reaction chamber 420 may be substantially concentric. That is, both the resonator shell 400 and the reaction chamber 420 within the resonator may be spherical in shape and may have the same or approximately the same centers. In this example, acoustic energy 412 will propagate from transducers 410 through shell 400 and inwardly 414 towards the surface of reactor 420. The reactor 420 is manufactured of a material, which is acoustically transparent or substantially permissive to ultrasound energy 412 to allow the ultrasound energy to travel through the walls of reactor 420, and in to the material contained within reactor 420. In some embodiments where cavitation is desired, the acoustic energy 412 propagates inwardly 414 through the walls of reactor 420 and inwardly towards cavitation zone 422 where a desired cavitation transformation or reaction takes place on the material contained within reactor 420.

Figure 5:
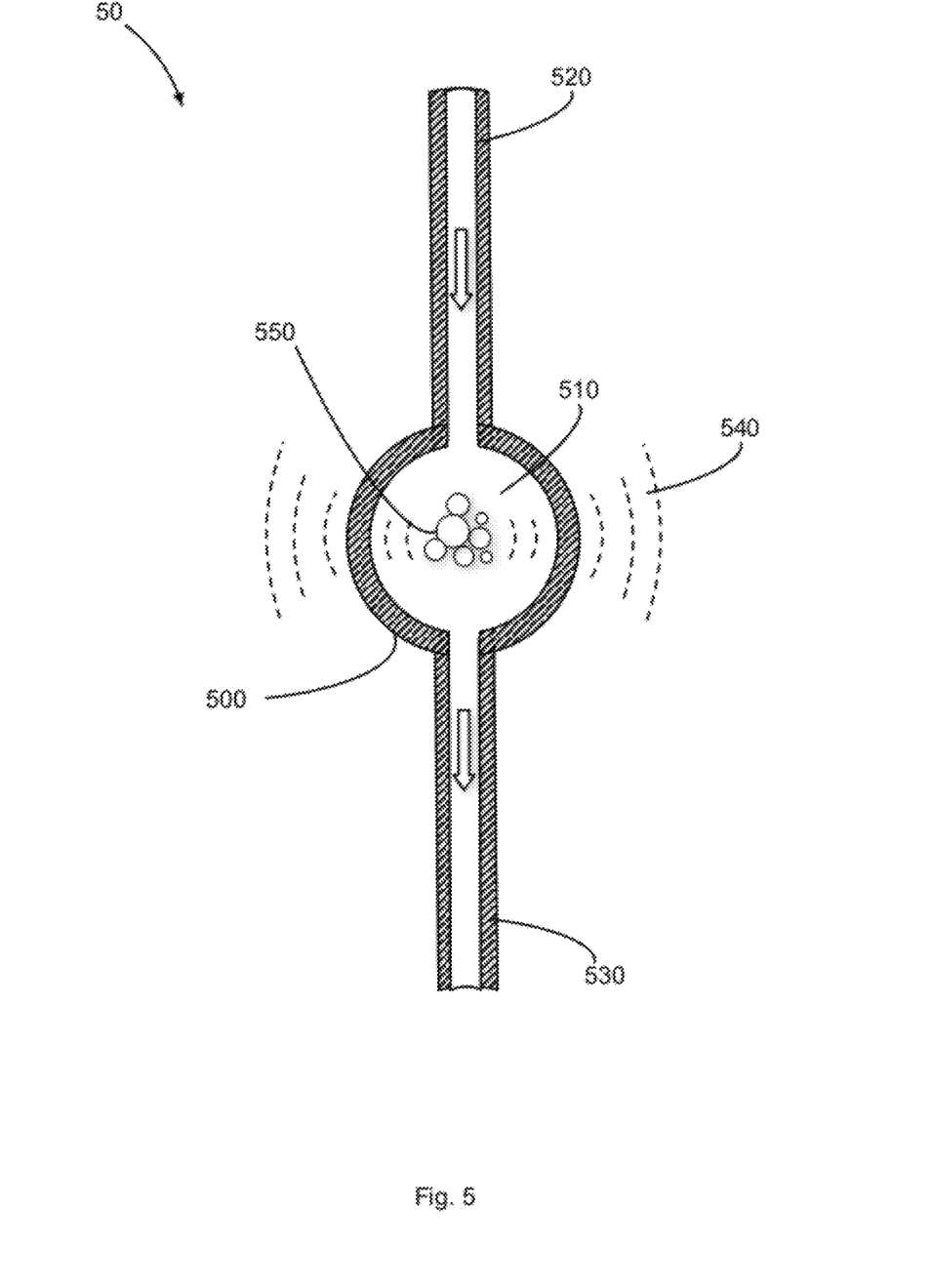
FIG. 5 illustrates an exemplary construction of a reactor.

FIG. 5 illustrates an exemplary construction of a reactor 50 according to the present disclosure. Reactor 50, which may be enclosed in a suitable resonator as described above, comprises a reaction chamber 500 having walls that are made of a material allowing an ultrasound acoustic field 540 to penetrate therethrough and into a central cavitation region 550 of the reactor chamber 500. One or more materials, which are to undergo acoustic reaction or ultrasonic cavitation, are contained in an internal volume 510 of reactor 50.

As described above, an inlet 520 and outlet 530 may be provided to provide a controlled flow of material through the reactor. Note that in some embodiments, a material may be allowed into volume 510 of the reactor 50 and then flow of the material may be stopped during the reaction until a desired dose of ultrasound or cavitation reaction takes place, and then the material may be released from the reactor.

Figure 6:
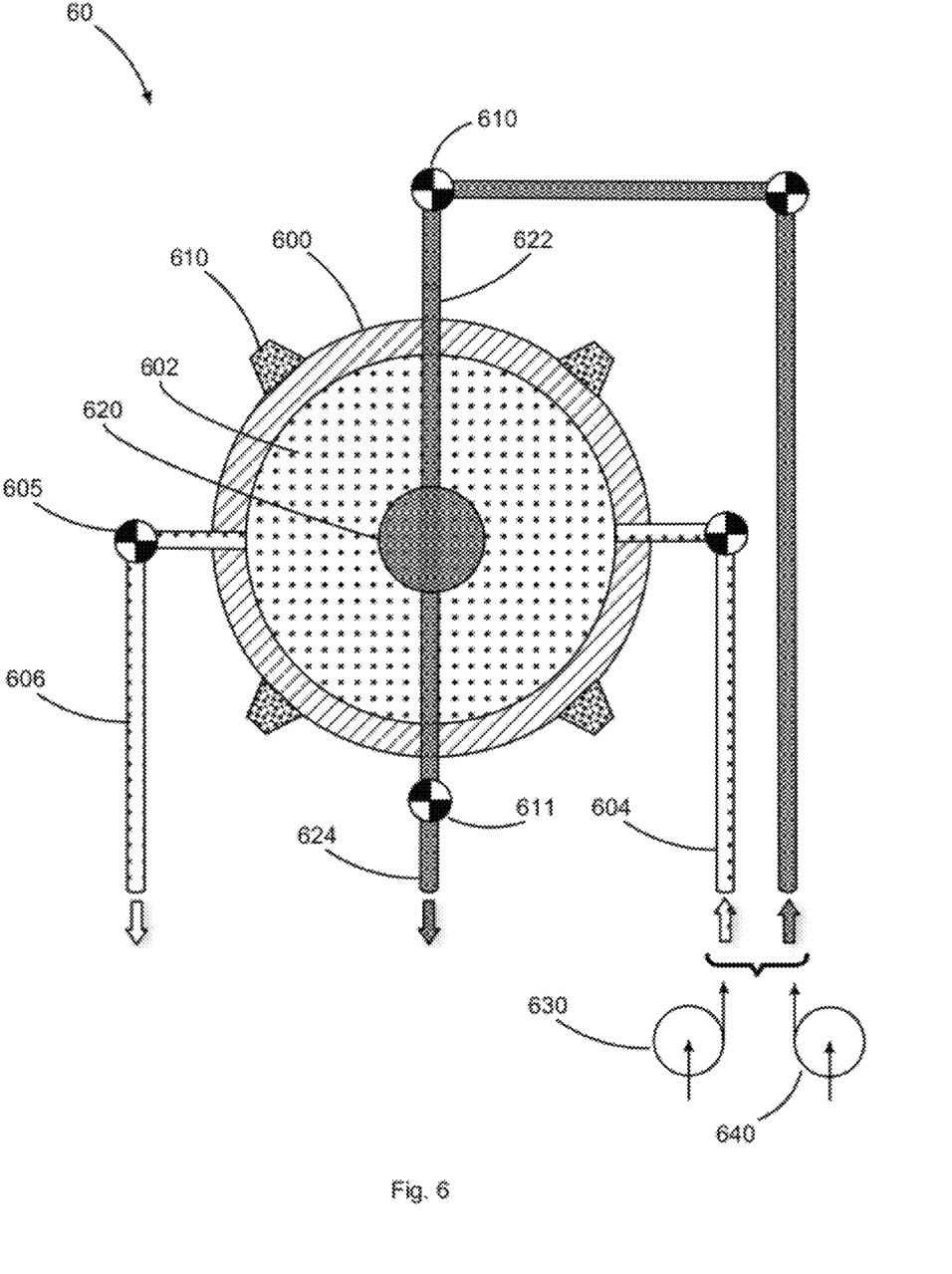
FIG. 6 illustrates an exemplary cavitation reactor within a resonator, showing two fluid circuits.

FIG. 6 illustrates an exemplary fluid circuit for use with a preferred embodiment of the present cavitation reactor within acoustic resonator system 60. As described before, a resonator 60 including a resonator shell 600 contains within it a cavitation reactor 620. Ultrasonic transducers 610 may be coupled to the external surface of resonator shell 600, and may be disposed in a plurality of ways as desired to achieve an acoustic field within the interior volume 602 of resonator 60.

A first fluid is disposed within interior volume 602 of resonator 60, and may pass into the resonator through a fluid port in shell 600 and out of an output port of shell 600. In the exemplary embodiment shown, the inlet port is provided in fluid line 604 and the output port is provided in fluid line 606. Shut off valves may be disposed in each or any of the fluid lines as appropriate for a given application.

A second fluid or a material contained within a fluid may be passed into an out of reactor 620. In the embodiment shown, a fluid shut off valve 610 is located in the inlet line 622 of the second fluid, and a separate shut off valve 611 is positioned at the outlet of the second fluid line 624.

Fluid pressure sources such as pumps may be used to drive each of the first and the second fluid through their respectively fluid circuits. For example, a first pump 630 may be used to drive the first fluid into and then out of the interior volume of acoustic resonator 60. A second pump 640 may be used to drive the second fluid through the cavitation reactor 620.

It can be seen that a pressure differential between the first and second fluids within the acoustic resonator shell 600 and the cavitation reactor 620, respectively, may result in a stress on the walls of the cavitation reactor 620. This stress may be detrimental to the system or may cause a rupture in the walls of the reactor 620 or the fluid circuit lines passing through the resonator 600. Therefore, in some embodiments, the output pressure of first and second pumps 630 and 640 may be regulated so as to maintain a same static pressure within the interior of resonator shell 600 and the interior of cavitation reactor 620.

In yet other embodiments, a single pump or pressure source may be used to pressurize both the resonator volume 602 as well as the interior of the cavitation reactor 620 so as to avoid any imbalance in static fluid pressure within these two volumes. Note that pressurizing one or both fluids according to the above embodiments may be accomplished through use of any number of known fluid pressure sources, including centrifugal pumps, rotary pumps, screw pumps, positive displacement pumps, proportioning pumps, reciprocating pumps, pistons, gas pressure loading reservoirs or other means. By having a mutual or shared source of pressure to load the static pressure of the fluids within the resonator volume 602 and within the cavitation reactor 620, it is possible to automatically balance the pressure in these two volumes and avoid any differential pressure form being applied to the walls of cavitation reactor 620. This can be especially useful in some embodiments where the walls of the reactor 620 are thin or made of a material that cannot withstand substantial negative or positive differential pressures.

By proper placement and use of shut off valves, for example 605, 610 and 611, it is possible to halt or interrupt the flow of one or more of the fluids within the system 60. As an example, the second fluid within the reaction chamber 620 may be loaded therein and then the outlet valve 611 may be shut trapping the second fluid in the reaction chamber line, while a desired cavitation reaction takes place within reactor 620. Similarly, the first pump 630 may apply a pressure so as to introduce the first fluid into resonator volume 602 while outlet valve 605 is shut so as to achieve a desired pressure within volume 602. However, in other embodiments cavitation through ultrasonic fields generated by transducers 610 is allowed to take place within reactor 620 while the second fluid dynamically flows through the reactor 620 by passing from its inlet valve 610 and out its exit valve 611.

In some embodiments, the relative or absolute sizes (e.g., diameters) of the cavitation reactor chamber 620 and the resonator shell 600 may be designed so that their walls lie at optimum locations with respect to the acoustic fields therein. For example, the resonator 600 and acoustic sources 610 may generate and hold an acoustic field having nodes and antinodes in volume 602. The walls of reactor 620 may be dimensioned and located to be substantially at a node of the acoustic field in resonator 600. In this way, no movement or minimum fluid velocity may be achieved at or near the walls of reactor 620, therefore placing no or minimum load on the walls of the reactor 620.

Figure 7:
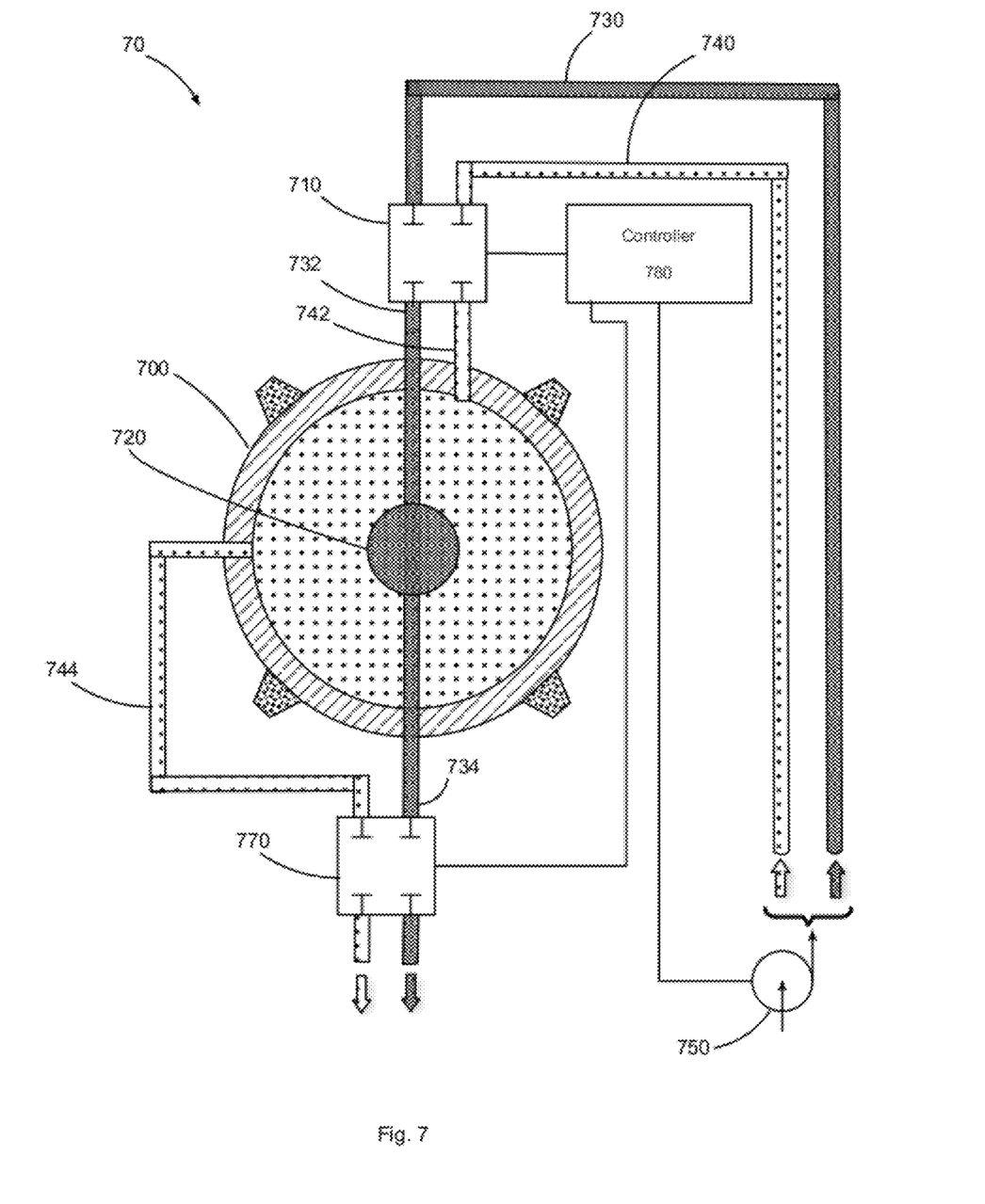
FIG. 7 illustrates an exemplary reactor and cavitation system with a two-fluid control system.

FIG. 7 illustrates an exemplary cavitation reactor 720 within an acoustic resonator 700 as described above. Two fluids are circulated into the resonator chamber 700 and reactor chamber 720 respectively. The two fluids may be driven by two separate and separately controllable pressure sources (e.g., pumps) as mentioned before, or may have their pressures controlled by a single pump 750.

The first fluid is used to fill resonator 700 and propagate and carry the acoustic field therein, while the second fluid is the fluid that contains the material desired to cavitate. The fluids each run through a respective fluid circuit including control valves and flow channels (e.g., tubing) and pressure supply sources (e.g., pump 750) to drive the flows as needed, including to start or stop the respective flow of the two fluids.

In the shown embodiment, a controller 780 controls pump 750 and valves 710 and 770. Valves 710 and 770 may be solenoid or hydraulic valves that have a plurality of inlet and outlet ports to permit or restrict or stop the flow of any of the first and second fluids therethrough. In previous examples, the flow control valves were given as dedicated to a respective first or second fluid. Here, a same valve is used to receive both fluids, and internal to the valve there are flow paths and components to cause the flow or stoppage through the respective flow paths.

Valves 710 and 770 may be manually operated as well. Each of the flow paths of the first and second fluids through valves 710 and 770 may be individually controlled by an operator or by an automatic controller 780. Specifically, in an embodiment, first fluid (e.g., water, a liquid metal, etc.) may be introduced by line 740 into inlet control valve 710. Inlet control valve 710 may controllably pass the first fluid out by line 742 into the interior of the resonator 700. Pressure may be maintained by pump 750 or a manual screw pressurizer or other means. When desired, the first fluid may be discharged from resonator 700 through discharge line 744 by way of discharge control valve 770. Similarly, a second fluid (e.g., a reactant or mixture or slurry of materials to be cavitated) arrives through line 730 and passes by way of inlet control valve 710 (through separate fluid passageways than the first fluid) on to line 732 and into reactor chamber 720 where it undergoes cavitation of a desired intensity and duration. After sufficient cavitation activity in reactor 720, the second fluid is discharged through line 734 by way of discharge control valve 770. The design and operation of inlet and discharge control valves 710 and 770 may be the same or similar to one another.

What is claimed is:

1. A method for causing cavitation in a substance, comprising:
    providing a first fluid substance in a spherical resonator chamber;
    applying acoustic energy to said spherical resonator chamber so that said acoustic energy is transmitted by said spherical resonator chamber into said first fluid substance in said spherical resonator chamber;
    providing a second fluid substance in a spherical cavitation reactor chamber disposed within said spherical resonator chamber;
    causing said acoustic energy to propagate from said first fluid substance through a wall of said spherical cavitation reactor chamber into said second fluid substance so as to cause acoustic cavitation within said second fluid substance; and
    wherein said spherical resonator chamber and said spherical cavitation reactor chamber are substantially concentric with respect to each other.

2. The method of claim 1, further comprising controlling a static pressure of at least said first or said second fluid substances.

3. The method of claim 2, further comprising controlling said static pressure in each of said first and second fluid substances so that said static pressures in both of said first and second fluid substances are substantially the same.

4. The method of claim 1, further comprising controlling a flow of said second fluid substance into and out of said spherical cavitation reactor chamber.

5. The method of claim 1, further comprising monitoring an effluent of said spherical cavitation reactor chamber.

6. A method for causing cavitation in a substance, comprising:
    providing a first fluid substance in a resonator chamber;
    applying acoustic energy to said resonator chamber so that said acoustic energy is transmitted by said resonator chamber into said first fluid substance in said resonator chamber;
    providing a second fluid substance in a cavitation reactor chamber disposed within said resonator chamber;
    causing said acoustic energy to propagate from said first fluid substance through a wall of said cavitation reactor chamber into said second fluid substance to cause acoustic cavitation within said second fluid substance; and
    wherein said causing said acoustic energy to propagate from said first fluid substance through a wall of said cavitation reactor chamber includes producing a standing wave, and wherein said producing a standing wave includes substantially locating a node of said standing wave at said wall of said cavitation reactor chamber.

7. The method of claim 6, further comprising controlling a static pressure of at least said first or said second fluid substances.

8. The method of claim 7, further comprising controlling said static pressure in each of said first and said second fluid substances so that said static pressures in both fluids are substantially the same.

9. The method of claim 6, further comprising controlling a flow of said second fluid substance into and out of said cavitation reactor chamber.

10. The method of claim 6, further comprising monitoring an effluent of said cavitation reactor chamber.

* * * * *